United States Patent
Mitts et al.

(10) Patent No.: US 7,009,657 B2
(45) Date of Patent: *Mar. 7, 2006

(54) METHOD AND SYSTEM FOR THE AUTOMATIC COLLECTION AND CONDITIONING OF CLOSED CAPTION TEXT ORIGINATING FROM MULTIPLE GEOGRAPHIC LOCATIONS

(75) Inventors: Jeremy Mitts, Tulsa, OK (US); Joe Dulin Taylor, Jr., Tulsa, OK (US)

(73) Assignee: Medialink Worldwide Incorporated, New York, NY (US)

( * ) Notice: Subject to any disclaimer, the term of this patent is extended or adjusted under 35 U.S.C. 154(b) by 176 days.

This patent is subject to a terminal disclaimer.

(21) Appl. No.: 09/911,320

(22) Filed: Jul. 23, 2001

(65) Prior Publication Data

US 2002/0044219 A1 Apr. 18, 2002

Related U.S. Application Data

(63) Continuation-in-part of application No. 09/332,723, filed on Jun. 14, 1999, now Pat. No. 6,266,094.

(51) Int. Cl.
H04N 7/08 (2006.01)
H04N 7/16 (2006.01)
H04N 5/278 (2006.01)

(52) U.S. Cl. .................... 348/465; 348/468; 725/53; 725/86; 725/115; 725/137

(58) Field of Classification Search ............... 348/465, 348/468, 461, 466–467, 478, 552, 554, 569, 348/589, 906; 707/3, 10; 709/219; 725/53, 725/86–104, 115, 120, 137, 139, 145; H04N 5/278, H04N 7/08, 7/16

See application file for complete search history.

(56) References Cited

U.S. PATENT DOCUMENTS

| 5,140,419 A | * | 8/1992 | Galumbeck et al. ........ 348/465 |
| 5,428,400 A | * | 6/1995 | Landis et al. ............... 348/569 |
| 5,481,296 A | * | 1/1996 | Cragun et al. .............. 725/136 |
| 5,703,655 A | * | 12/1997 | Corey et al. ................ 348/468 |
| 5,752,159 A | * | 5/1998 | Faust et al. ................. 725/105 |
| 5,809,471 A | * | 9/1998 | Brodsky ..................... 704/275 |
| 5,867,205 A | * | 2/1999 | Harrison ...................... 725/38 |
| 5,883,675 A | * | 3/1999 | Herz et al. .................. 348/465 |
| 5,995,155 A | * | 11/1999 | Schindler et al. ........... 348/461 |
| 6,005,565 A | * | 12/1999 | Legall et al. ............... 345/721 |
| 6,061,056 A | * | 5/2000 | Menard et al. ............. 345/704 |
| 6,243,676 B1 | * | 6/2001 | Witteman ................... 704/243 |
| 6,256,072 B1 | * | 7/2001 | Bae et al. ................... 348/568 |
| 6,295,092 B1 | * | 9/2001 | Hullinger et al. .......... 348/468 |
| 6,347,215 B1 | * | 2/2002 | Chan .......................... 725/99 |

(Continued)

Primary Examiner—Brian P. Yenke
(74) Attorney, Agent, or Firm—Lackenbach Siegel, LLP

(57) ABSTRACT

There is provided a system for the automatic collection and conditioning of closed caption texts originating from multiple geographic locations, comprising: (1) at least one remote capture client means having a tuner to receive one or more television signals, a decoder to decode closed caption text stream in the television signals, and means to write the closed caption text stream to a text file, (2) central server means operatively connected to the remote capture client means for storing the text files and making the text files available to a user, and (3) an inquiry client means operatively connected to the central server means for searching the text files. The remote capture client is preferably adapted to automatically create text files and "push" them to the central server. The central server is preferably adapted to provide search results and/or text files to the inquiry client via a web browser.

12 Claims, 5 Drawing Sheets

U.S. PATENT DOCUMENTS

| | | | |
|---|---|---|---|
| 6,549,905 B1 * | 4/2003 | Kim et al. | 707/10 |
| 6,637,032 B1 * | 10/2003 | Feinleib | 725/110 |
| 6,742,188 B1 * | 5/2004 | Del Castillo | 725/153 |
| 6,766,163 B1 * | 7/2004 | Sharma | 455/412.1 |
| 6,766,528 B1 * | 7/2004 | Kim et al. | 725/113 |
| 6,775,842 B1 * | 8/2004 | Van Gestel | 725/136 |
| 6,816,201 B1 * | 11/2004 | Fang et al. | 348/468 |
| 2001/0049826 A1 * | 12/2001 | Wilf | 725/120 |
| 2002/0067428 A1 * | 6/2002 | Thomsen | 348/465 |
| 2002/0101537 A1 * | 8/2002 | Basson et al. | 348/465 |
| 2002/0122136 A1 * | 9/2002 | Safadi et al. | 348/465 |
| 2002/0171760 A1 * | 11/2002 | Dyer | 348/468 |
| 2003/0122963 A1 * | 7/2003 | Kim et al. | 348/468 |
| 2003/0212997 A1 * | 11/2003 | Hejna, Jr. | 725/88 |
| 2004/0080528 A1 * | 4/2004 | Rand et al. | 345/738 |

* cited by examiner

METHOD AND SYSTEM FOR THE AUTOMATIC COLLECTION AND CONDITIONING OF CLOSED CAPTION TEXT ORIGINATING FROM MULTIPLE GEOGRAPHIC LOCATIONS

RELATED APPLICATIONS

This application is a continuation-in-part of U.S. patent application Ser. No. 09/332,723 filed Jun. 14, 1999, now U.S. Pat. No. 6,266,094 granted Jul. 24, 2001.

BACKGROUND OF THE INVENTION

1. Field of the Invention

The present invention relates to methods and systems for monitoring, decoding, transmitting, and archiving of closed caption texts from television broadcasts. More particularly, the present invention relates to methods and systems for the automatic collection and conditioning of closed caption texts originating from multiple geographic locations, and resulting databases produced thereby.

2. Description of the Prior Art

In the United States, television stations currently create more than 12,000 hours of local news programming every week. Network and cable news organizations broadcast an additional 1,400+hours. Because every newscast contains references to specific persons, organizations, and events, an entire industry has grown up to monitor newscast content on behalf of newsmakers. The traditional monitoring approach required workers to videotape, view, and summarize the content of TV newscasts. However, using such a traditional method, it is very difficult to monitor every newscast on every channel on a timely basis. Thus, a need exists for newsmakers and other interested parties to have comprehensive and cost effective real time access to a database of newscast content.

Closed captioning, which is mandated by the Federal Government for most television programs, is a textual representation of the audio portion of a television program. Originally devised as a means for making program dialogue accessible to the deaf and hearing impaired, closed captioning is often displayed now for the convenience of non-deaf persons in environments where television audio is not practical, such as noisy restaurants and airport kiosks. Closed captioning is encoded into the video blanking intervals (VBI), which are part of the video component of a conventional television signal. In the United States, line 21 of the VBI is reserved for carrying closed captioning.

One approach to monitoring television broadcasts by using closed caption text is disclosed in U.S. Pat. No. 5,481,296, issued Jan. 2, 1996, to Cragun et al., and titled APPARATUS AND METHOD FOR SELECTIVELY VIEWING VIDEO INFORMATION. The Cragun et al. system provides a closed caption decoder that extracts the closed caption text from a television broadcast. A viewer specifies one or more keywords to be used as search parameters and a digital processor executing a control program scans the closed caption text for words or phrases matching the search parameters. The corresponding complete video recording of the television broadcast may then be displayed, edited, or saved. In one mode of operation, the Cragun et al. system may be used to scan one or more television channels unattended and save items that may be of interest to the viewer. In another mode of operation, the Cragun et al. system may be used to assist in quickly locating previously stored video recordings. One clear disadvantage of the Cragun et al. system is that extremely large amounts of memory are required to store the video segments.

One approach to monitoring television broadcasts by using closed caption text is disclosed in U.S. Pat. No. 5,809,471 issued Sep. 15, 1998 to Brodsky et al and titled RETRIEVAL OF ADDITIONAL INFORMATION NOT FOUND IN INTERACTIVE TV OR TELEPHONY SIGNAL BY APPLICATION USING DYNAMICALLY EXTRACTED VOCABULARY. Significant limitations of the Brodsky patent are that server based features are missing and only single closed caption data is monitored from a specific geographic site, as opposed to broad geographical and dispersed sites in the present application. As such, the present design has features and benefits that are not in the Brodsky design.

SUMMARY OF THE INVENTION

It is an object of the present invention to provide a substantially real-time, comprehensive, and cost effective means for the monitoring, decoding, transmission, filing and retrieval of television word content through the client server based processing of closed caption text. It is another object of the invention to provide such means that makes such text accessible to end users via the Internet or other communication networks. It is another principal object of the present invention to provide automatic delivery of such search resultant text to non-current (i.e., prior inquiry) clients. Other objects of the present invention, as well as particular features, elements, and advantages thereof, will be elucidated in, or be apparent from, the following description and the accompanying drawing figures.

The foregoing objects of the present invention are achieved by providing a system for the automatic collection and conditioning of closed caption texts originating from multiple geographic locations, comprising: (1) at least one remote capture client means having a tuner to receive one or more television signals, a decoder to decode closed caption text stream in the television signals, and means to write the closed caption text stream to a text file, (2) central server means operatively connected to the remote capture client means for storing the text files and making the text files available to a user, and (3) an inquiry client means operatively connected to the central server means for searching the text files. The remote capture client is preferably adapted to automatically create text files and "push" them to the central server. The central server is preferably adapted to provide search results and/or text files to the inquiry client via a web browser.

DETAILED DESCRIPTION OF THE PREFERRED EMBODIMENTS

Figure 1:
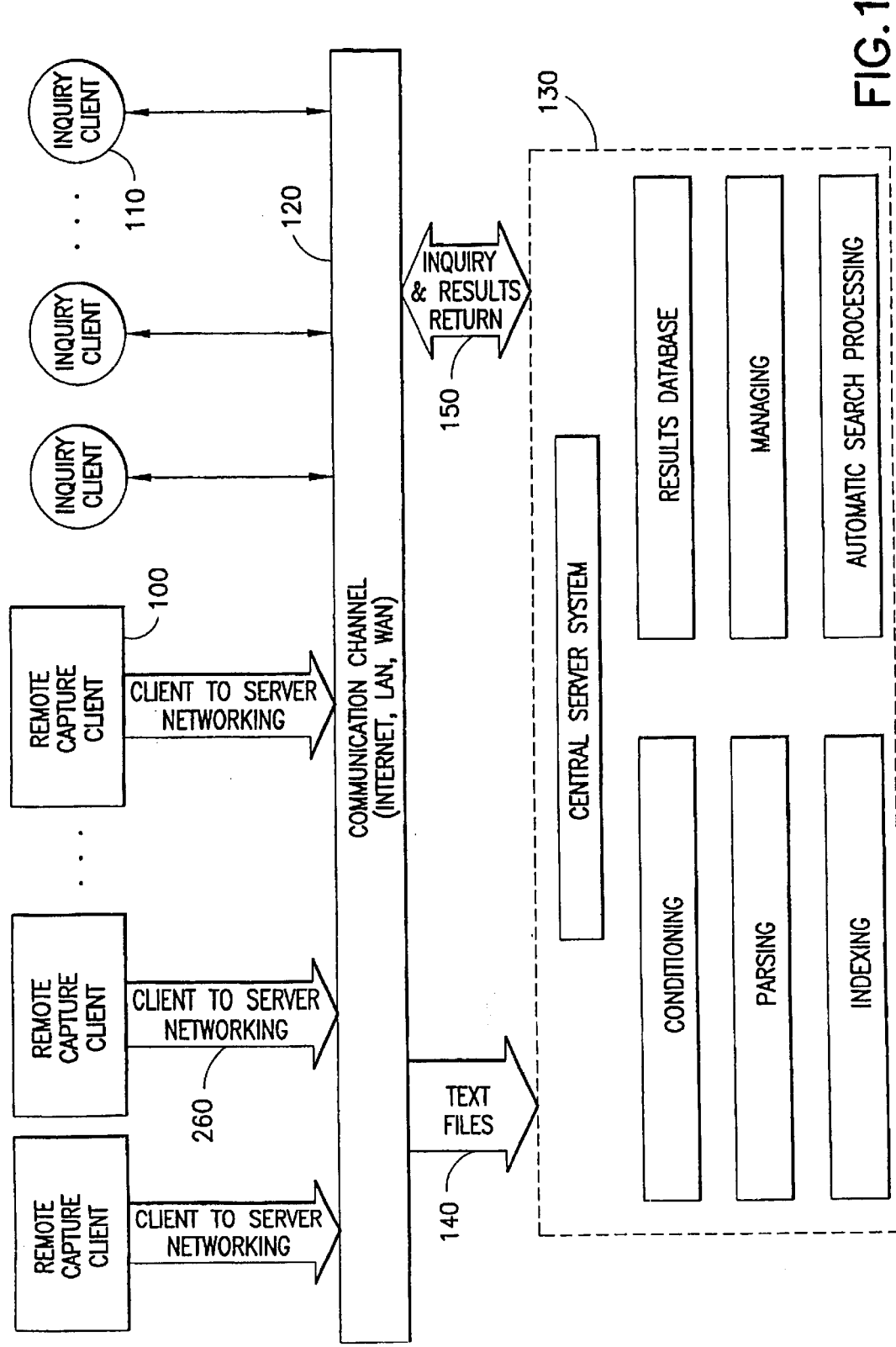
FIG. 1 is block diagram of a system for capturing, processing, and displaying closed caption text according to the present invention having a remote capture client, an inquiry client, and a central server.

Referring to the drawings and, in particular, FIG. 1, there is illustrated a system according to the present invention having remote capture client means 100, inquiry client means 110, and a central server 130.

Remote capture client means 100 generates decoded closed caption text files. Remote capture client means 100 may be operated as a client or as a server (see FIG. 3). Remote capture client means 100 sends a text file 140 to central server means 130 through communication means 120 using a client to server networking program 260. Communication means 120 may be any suitable method of communication, including the Internet, a local area network (LAN), and/or a wide area network (WAN). Client to server networking program 260 can manage numerous text files arriving from a plurality of remote capture client means.

Inquiry client means 110 is used to accesses central server means 130 for the purpose of searching closed caption text files stored on central server means 130. Inquiries and results are transmitted between inquiry client means 110 and central server means 130 via communications means 120. The connection between inquiry client means 110 and central server means 130 may be user-initiated or "interactive." In the alternative, the connection may be automatically initiated by central server means 130 at a pre-selected time or when results from a pre-specified search are available.

Central server means 130 is connected to both remote capture client means 100 and inquiry client 110. Central server means 130 collects, conditions, and stores text files received from remote capture client means 100. In addition, central server means 130 receives inquiries from inquiry client 110, processes those inquires, and returns search results to inquiry client 110. Preferably, central server means 130 performs its tasks on a continuous basis, 24 hours a day, 7 days a week.

Figure 2:
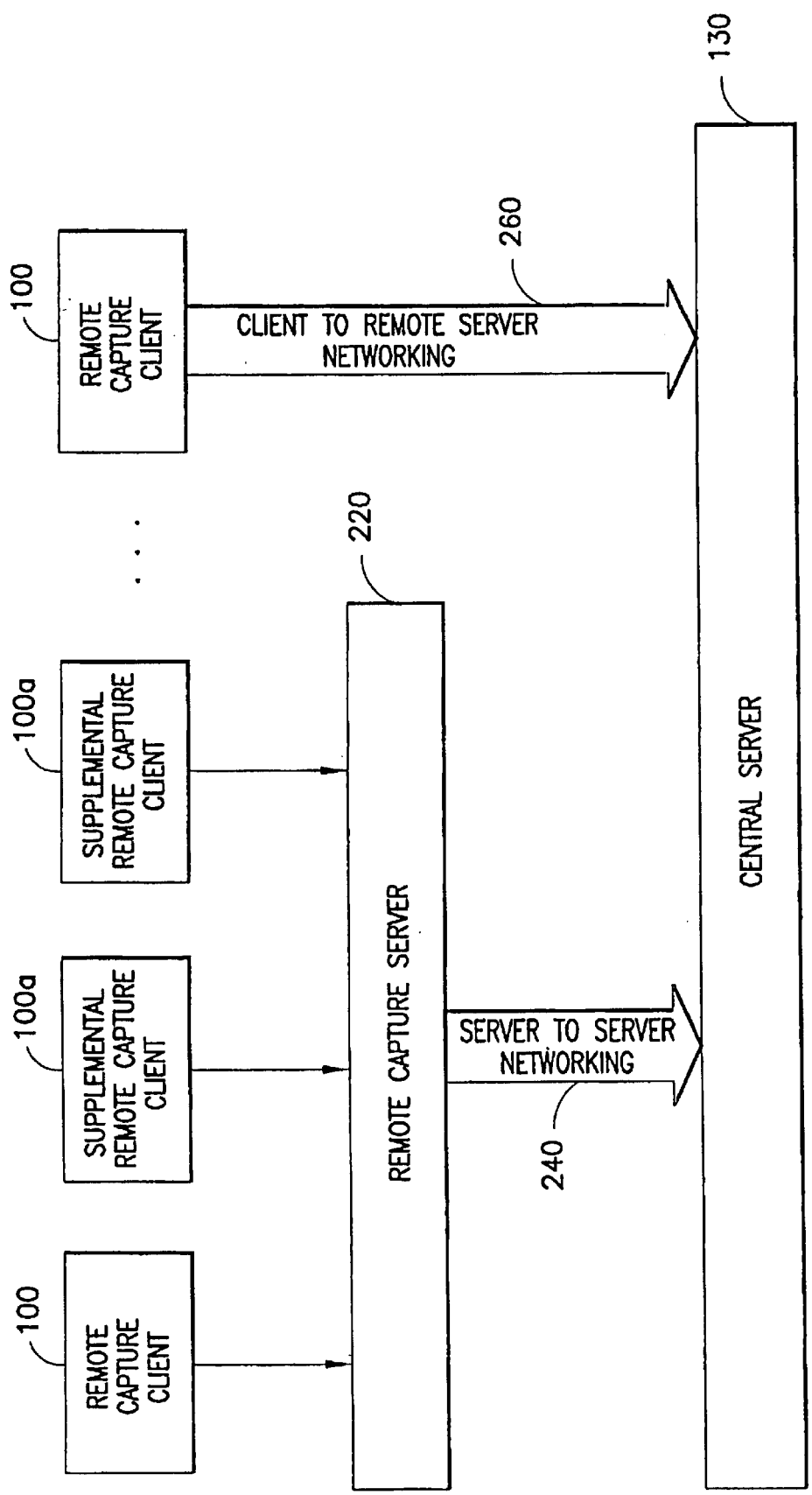
FIG. 2 is a block diagram representing two methods of transferring text files from the remote capture client to the central server.

FIG. 2 illustrates that remote capture client means 100 may be connected directly and/or indirectly to central server means 130. An indirect connection between remote capture client means 100 and central server means 130 passes through a remote capture server means 220.

Remote capture client means 100 may be located geographically, strategically, economically, and/or conveniently. In many locations, remote capture client means 100 can satisfy all of the closed caption capturing requirements and, as such, a lower cost system may be employed wherein remote capture client means 100 communicates directly with central server means 130 through client to server networking 260 (see also FIG. 1). In the alternative, remote capture client 100 may be employed together with a supplemental capture client means 100*a*. When supplemental capture client means 100*a* is used in the system, remote capture client means 100 and supplemental capture client means 100*a* are preferably connected to remote capture server 220 via a suitable communications means, such as the Internet, a LAN, and/or a WAN. Remote capture client means 100 and supplemental capture client means 100*a* send text files to remote capture server means 220 rather than directly to central server means 130. Remote capture server means 220 collects text files from both remote capture client means 100 and supplemental capture client means 100*a*. Remote capture server means 220 communicates to central server means 130, as time, conditions, or other requirements are satisfied. For example, remote capture server means 220 may collect information from its assigned capture clients 100, 100*a* during a twenty-four hour period and transfer the collected text files to central server means 130 in a single communication session via server to server networking 240. Moreover, remote capture client means 100 may be adapted to directly or indirectly communicate with supplemental capture client 100*a* for centralization, redundancy, load sharing, and/or cost saving reasons.

In a preferred embodiment of the present invention, text files are transferred from remote capture client means 100 to central server means 130 across the Internet using a protocol, such as File Transfer Protocol (FTP). An FTP connection may be controlled either by remote capture client means 100 or central server means 130. When an FTP connection is controlled by remote capture client means 100, the FTP connection is referred to as a "push" connection because the text files are transferred by an outgoing FTP connection. When an FTP connection is controlled by central server 130, the FTP connection is referred to as a "pull" connection because to text files are accepted from an incoming FTP connection. However, some servers reject incoming FTP connections. For example, some firewall devices restrict the ability of a server to accept incoming FTP connections, so therefore a remote server can not "pull" data. Nonetheless, all servers can "push" data. Thus, it is preferable that the system according to the present invention be designed to "push" rather than "pull" all text files, for system consistency and ease of management.

FTP sessions between remote capture client 110 and central server 130 may transfer entire directory structures. Optionally, the source text files may be deleted from local capture client 100 after the transfer is complete and the system has verified that the text files exists on central server 130. This is a true "move" operation. Of course, if the text files are not successfully transferred, the system will re-transfer the sources files during the next FTP session. The system may establish an FTP session between remote capture client 100 and central server 130 automatically either (1) when a text file is created at remote capture client 100, (2) a specific time interval has elapsed (e.g. 60 minutes), and/or (3) a specific time has been requested (e.g. 2 AM). A preferred FTP API is available in Microsoft's Windows 2000 operating system. Optional features may be implemented in the present system, method, and database using an API wrapper.

Figure 3:
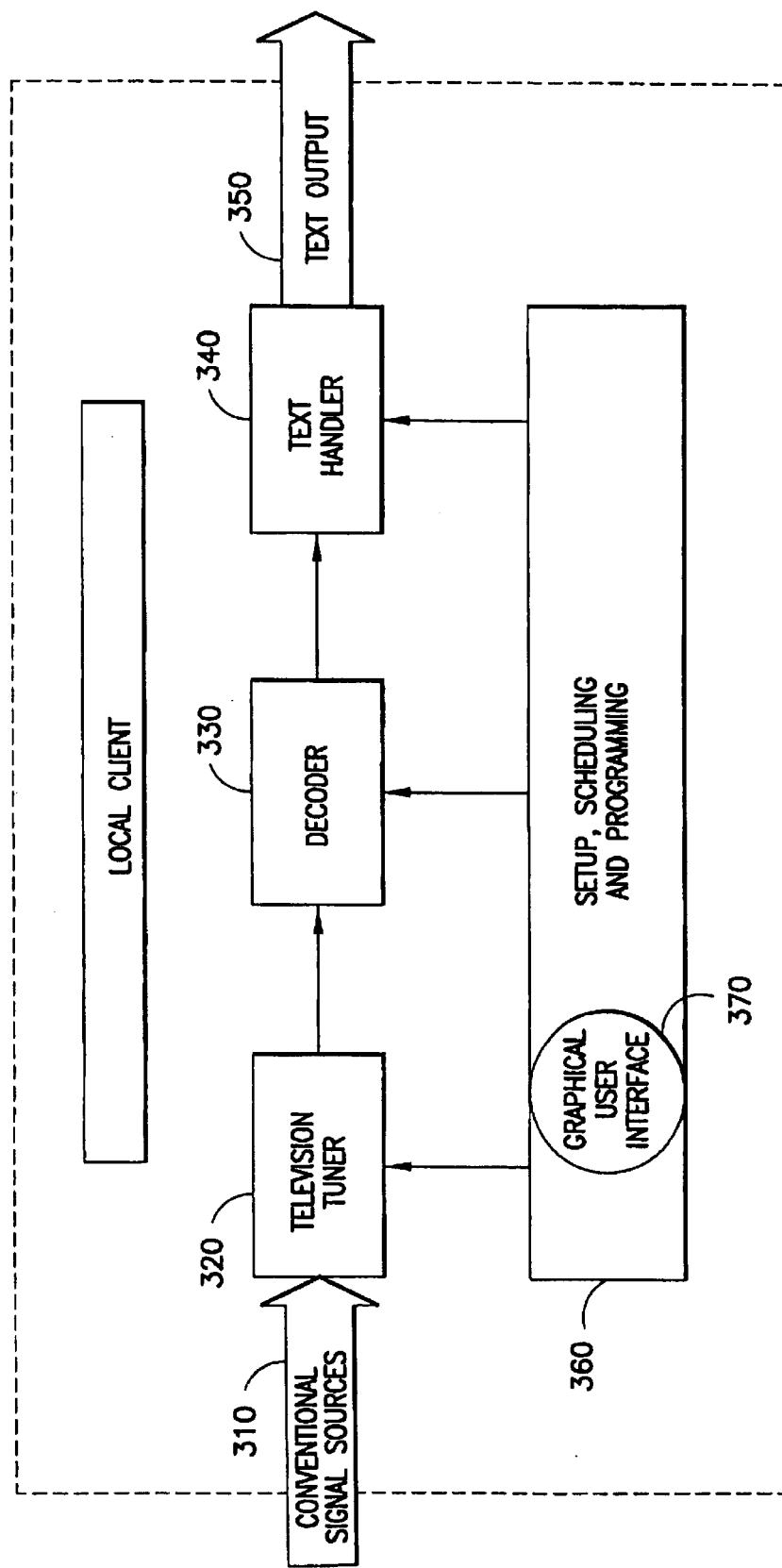
FIG. 3 is a block diagram representing the operation of the remote capture client of FIG. 1.

Remote capture client means processing is outlined by FIG. 3. Remote capture client means processing begins with one or more conventional signal sources 310, which may be received by a broadcast antenna, broadcast cable, video tape player, or any other video source. Convention signal source 310 is received by to a tuner 320. Tuner 320 is tuned to receive a desired frequency by hardware and software functions contained in a setup, scheduling, and programming means 360 via a graphical user interface 370. Preferably, the setup, scheduling and programming means 360 manages tuner 320, as well as a decoder 330, and a text handler 340.

Tuned signals are passed from tuner 320 to decoder 330. Decoder 330 interprets and/or decodes any closed caption text in the tuned signals. A preferred embodiment of decoder 330 has been developed by Medialink Worldwide, Inc. and is known as TeleCap™. Other suitable decoding programs are commercially available and include, by way of example, Le Petit Decoder™ by SoftNi Corporation.

Decoder 330 passes the interpreted closed caption text to text handler 340, which writes the closed caption text into a text file. Text handler 340 can insert useful information into the text file including broadcast related data, such as time, date, broadcast station identifiers, broadcast market identifiers, broadcast station city, program title, and program actors and/or participants.

Text output process 350 sends the text file from text handler 340 either to central server means 130 or a remote capture server means 220 (see FIG. 2). Preferably, text output process 350 is initiated after a text file is closed. Closing a particular text file can be accomplished under user specified control or based upon system pre-set parameters governed by the application. For example file closing may occur automatically when the recorded program concludes, a specific time interval has elapsed (e.g. 60 minutes), or a specific time has been requested (e.g. 2 AM), as well as other opportunities as warranted.

Tuner 320, decoder 330, text handler 340, setup, scheduling, and programming means 360, and graphical user interface 370 may be incorporated into a single hardware device. A number of commercially available computer hardware devices and internal computer boards provide tuning and decoding capabilities. For example, a preferred embodiment of the present invention makes use of a computer board manufactured by the PosTech Company of Madison, Wis. However, any closed captioning decoding device known in the art may be used as part of the present invention.

Preferably, both remote capture client means 100 and central server means 130 can manage aspects of remote capture client means processing and operation, such as 1) initialization, 2) programming, 3) upload and download times, 4) error processing and 5) updating.

Figure 4:
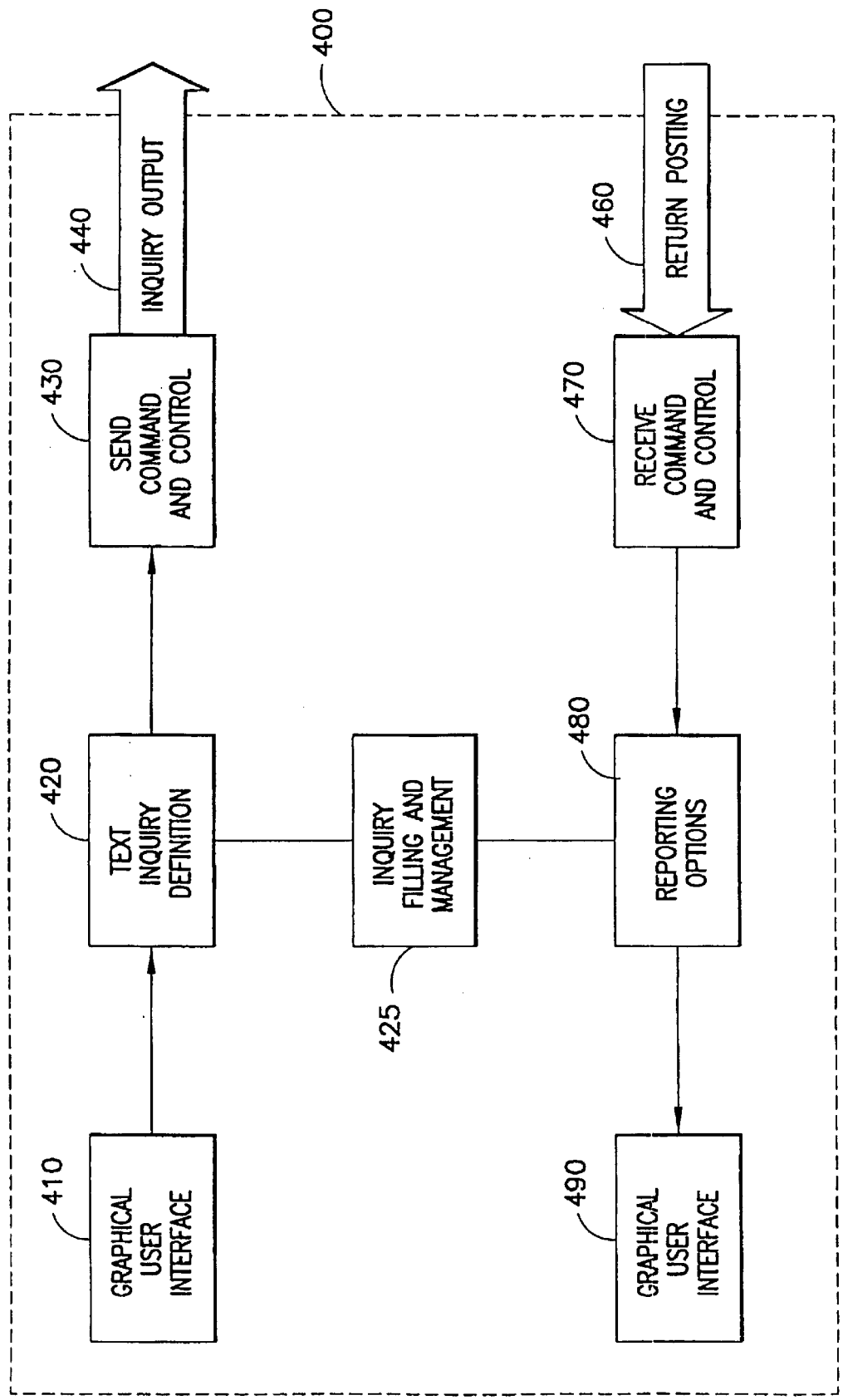
FIG. 4 is a block diagram representing the operation of the inquiry client of FIG. 1.

FIG. 4 outlines inquiry client means processing. A user employs a graphical user interface 410 to define a text inquiry definition 420. Text inquiry definition 420 is structured by a send command and control program 430 for submission to central server means 130 via an inquiry output program 440. Text inquiry definition 420 can be maintained on inquiry client 110 by an inquiry filing and management program 490. This allows the user to review previous postings and to use the same inquiry or a modified inquiry in the next search interval.

Text inquiry definition 420 may also be maintained as part of a detailed search profile. Such a search profile will include information about the text inquiry definition, such as key words, key phrases, selected stations, selected markets, when and/or if the text inquiry definition should be compared against the database of text files (e.g., every 24 hours for 30 days), and limits to the search results (e.g., the first 100 records found). A search profile will also include information about the user that submitted text inquiry definition 420, such as name, password, email address, and limitations on access (e.g., 5 text inquiry definitions per month).

In preferred embodiments, users have the option to permanently save one or more profiles for later retrieval and use during an active user-initiated search or alternatively, in an automatic current user interactive search. Moreover, users have the option to share permanently saved profiles with other selected users. In addition, profiles must necessarily be permanently saved for some discrete time frame on central server means 130 as part of automated search routines, such as automatic search processing 580 (see FIG. 5). The search profiles can be saved at central server means 130 and/or inquiry client means 110. To conserve resources, if a given profile is not permanently saved, central server means 130 maintains the profile for a predetermined interval (e.g., one day) and then removes the profile. Preferably, removing profiles from central server means 130 is done when system demand is low. A preferred routine for removing profiles from central server means 130 uses a scheduled command, such as Microsoft SQL Server Agent, which is available as part of Microsoft SQL Server 6.5 and in newer versions.

A return posting 460 from central server means 130 is processed by the receive command and control routine 470 to manage any interface exchange or conversion option required by the application. Return posting 460 may be in one or more forms, such as an interactive results return or an automatic notification. Search results returned to inquiry client 110 will be displayed at graphical user interface 490 as formatted by reporting options routine 480. For example, the search results can be displayed as a list of program citations, with each citation having a sub-listing of key sentences. In addition, graphical user interface 490 can display Internet-oriented pages, links, and/or buttons. Buttons on the results page allow a user to expand key sentences into stories and stories into whole newscasts. Program citations identify specific news programs that include the words being searched for. For example, a program can be identified by the date it was broadcast, the city (or market) from which the broadcast originated, the call letters or name of the station or program source originating the broadcast, the name or title of the program, and the time of day the program was broadcast.

Figure 5:
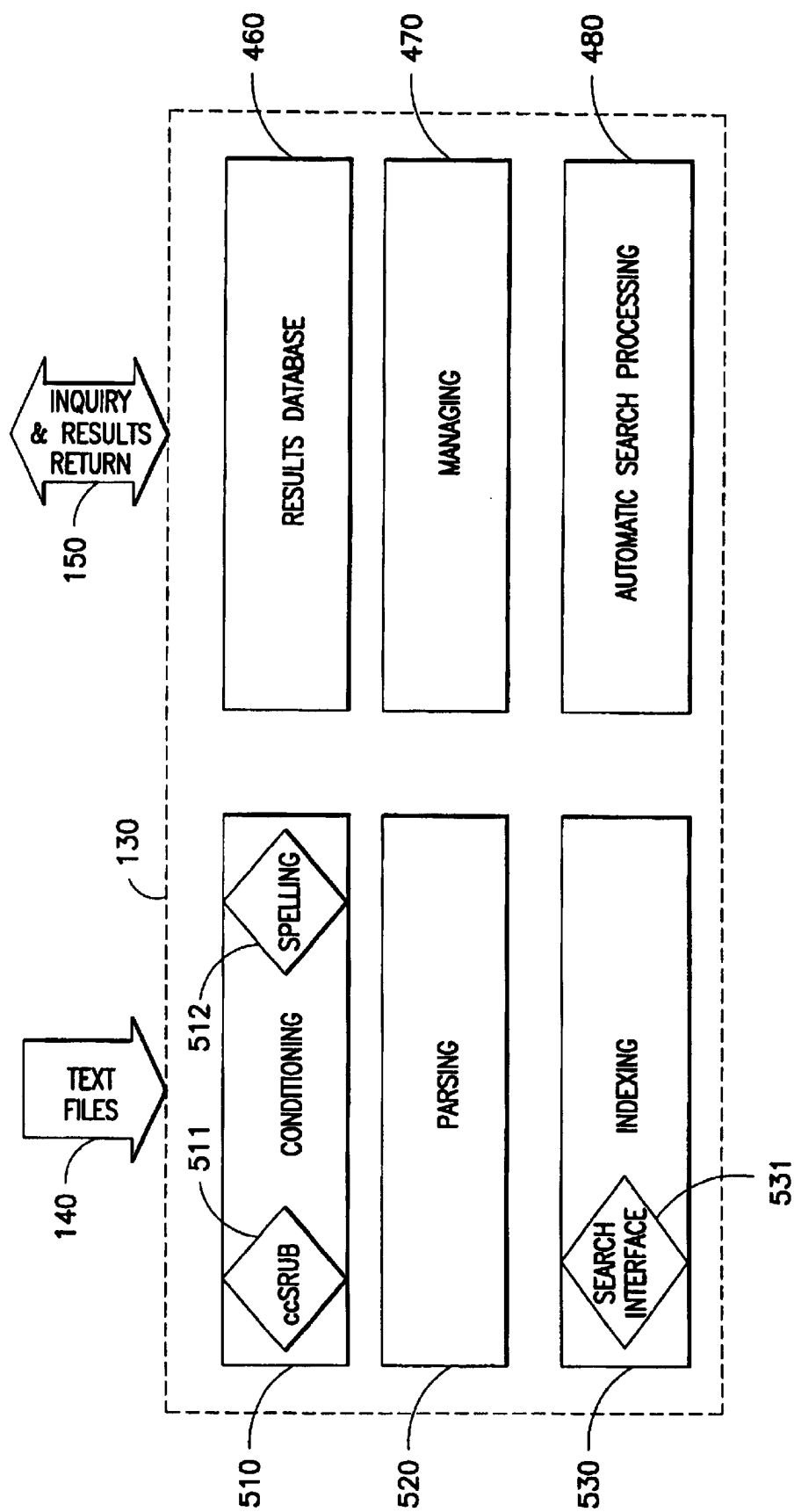
FIG. 5 is a block diagram representing the operation of the central server of FIG. 1

In a preferred form of the present invention, inquiry client 110 sends and receives search results and/or text files from central server 130 via a web browser. Numerous methods have been developed to provide information over the web in a user-friendly format. Moreover, improvements to existing technology are being developed at a very rapid pace. The system, method, and database of the present invention may be adapted to utilize any current or future technology for data transfer. For example, server-side scripting is a popular and effective environment for presenting data from a server to a user. Currently, the system, method, and database of the present invention may utilize server-side scripting in the form of one or more environments, such as ASP, ISAPI, VB.NET, ASP.NET. Referring to FIG. 5, central server means processing begins with the receipt of a text file 140 from remote capture client means 100. Text file 140 can be processed by a series of subroutines designed to enhance the integrity and uniformity of text files, as well as archive, index, search, and deliver text files.

Text file 140 may be processed by a conditioning routine 510 that is designed to impose format consistency across all text files received by central server means 130 regardless of their origin. Text files from different networks, geographic areas, and locales may use non-conforming close captioning standards since several format standards are available for use. The recommended formatting standard is the standard established by the National Captioning Institute (NCI). NCI standards, amoung other things, specify specific symbolic patterns to mark the beginning or end of a single news story within a news broadcast. However, many broadcasters do not follow NCI standards. Nonetheless, broadcasting stations sometimes specify which standards they actually follow. Some broadcasting stations do not specify what standards they follow, but patterns can often be detected, either by a human or by computer, that indicate specific symbols the broadcasting station may be using in place of the NCI standards. As such, conditioning routine 510 can apply the particular standards or patterns of a given broadcast station to text files captured from that broadcast station, so that the resulting output text more closely follows a single standard. Thus, the conditioning routine 510 allows text files that deviate from NCI standards to be converted to substantially conform to NCI standards. Converting non-conforming text is preferably accomplished by comparing each and every text file received by central server means 130 against a database of station-specific formatting standards. Conversion routines developed for specific stations are invoked to change a non-conforming format to NCI standard formatting. For the present invention, the preferred program for performing the comparison and conversion of text files has been developed by Medialink Worldwide, Inc. and is referred to herein as ccScrub™, which is indicated in FIG. 4 as reference numeral 511.

A spelling check 512 may be used as part of conditioning routine 510 to impose spelling and abbreviation consistency to all sources. For example, the company name "AT&T" is spelled many different ways by different broadcasters (e.g., "A-T-and-T," "A T & T," and "A T and T"). An abbreviation subroutine in spelling check 412 would search for predefined variations of a company name and convert all variations into the standard abbreviation.

Text file 140 may be processed by a parsing routine 420. Parsing routine 420 is designed to parse an entire newscast or television event into its unique story parts or segments. Parsing routine 420 can apply user-defined and/or default rules to determine the parsing points within a program. Preferably, parsing routine 420 first determines whether a text file contains useful data. If a broadcaster has failed to provide captions for a given newscast or broadcast, the resulting text file will only contain time stamps. By counting the number of letter characters and the number of numeral characters in the file, a ratio can be calculated that may then be used to determine if a text file is worth processing. For example, if the letter to number ratio is below a user-defined variable, the file can be rejected for further parsing. If a text file is accepted for further parsing, markers are created within the text file for denoting the beginning and end of segments within text file 140. For example, a user-defined rule can set the end of a segment whenever a user-defined variable of time has elapsed without attendant captioning. A default rule could search for occurrences of the ">>>" symbol, which is the NCI standard symbol for denoting the beginning of a new story within a broadcast. Another default rule could search for occurrences of multiple time stamps uninterrupted by text and mark the beginning and ending of such sequences. A certain number of uninterrupted time stamps may denote either the occurrence of a commercial break or other non-captioned segment of a newscast. Once the appropriate markers have been inserted in text file 140, the content between each marker can be written to a new, separate text file. Each parsed text file preferably includes program origination information, total running time, and other segment information to better identify unique segments within a program. The new text files are named (e.g., by sequential number) and saved (e.g., to a new directory named for the particular newscast being processed). Parsing routine 420 continues until all identifiable segments of text file 140 have been written to separate parsed text files. When all the separate parsed text files have been written, the original version of text file 140 is preferably deleted from the disk. A preferred program for parsing text files has been developed by Medialink Worldwide, Inc. and is referred as ccSplit™.

Indexing routine 430 creates an index of the words contained in text file 140. The words in text file 140 are preferably indexed along with other information about text file 140, such as its time and place or origin. The preferred program for use in indexing routine 430 is the Microsoft™ Index Server (version 2.0) or the Microsoft™ Content Indexing Services (version 3.0). However, any appropriate indexing software may be used.

Another element of indexing routine 430 is a search engine interface 431 that allows users to submit search profiles, as described above, to the index of words. Search engine interface 431 could allow searches using Boolean logic. The results data generated by searching the index of words against a submitted profile are written to a results database 460. Writing search results to results database 460 allows for the ordering and other manipulation of the results data. The preferred results database is a structured query language database, such as Microsoft SQL Server™, although other databases may be used.

Managing routine 470 supports the need for file management, archiving, restoring, and backing-up, as well as satisfying the overall file integrity requirements of central server means 130. Preferably, an appropriate graphical user interface (not shown) is employed for these purposes. System information, including text information, system operational parameters, and query postings can be appropriately managed, archived and compressed as needed for system calibration, redundancy and report management purposes.

One particularly preferred embodiment includes automatic search processing routine 480. A web page interface from inquiry client means 110, for example, allows a user to initiate automatic search processing routine 480. Automatic search processing routine 480 submits a search profile to the index of words, either at a pre-determined time, or time interval, or each time the index of words is updated. The results are written to database 460 in the same fashion as described above. If and when results are written to results database 460, the user is notified via a messaging system and/or device, such as an electronic mail message ("e-mail") or a mobile telephone. Notification may be initiated by central server means 130 in the form of an electronic mail message, a "pop-up window," and/or other suitable forms. In the alternative, notification may be initiated when inquiry client means 110 establishes communications with central server means 130, such as by a dial-up connection. The preferred embodiment of automatic search processing routine 480 is a program developed by Medialink Worldwide, Inc. called AutoAler™.

Optionally, central server means processing may include a document generating routine 570 for generating documents in printer-friendly format rather than merely for display on a monitor. Selected text documents that are sent to inquiry client 110 by central server means 130 to inquiry client means 110 are preferably formatted for an Internet-oriented graphical user interface (i.e., a web browser). A particularly preferred format is hypertext markup language (HTML). Yet, there are cases where a user may want to have selected text documents formatted specifically for printing. While it is often possible for a user to print a document initially formatted in HTML, the formatting of such a printed document is often undesirable. For example, there is no way to specify a section or sub-section header or footer or a specific location to start a new printed page in HTML, so a text file that spans more than one printed page would only have a citation at the beginning of the printed document.

Instead of HTML formatting, a user may elect to have a selected text document formatted directly into a printable and reader-friendly format, such as a Microsoft Word™ document, and downloaded to inquiry client means 110. Such a printable and reader-friendly document may contain useful information not included in an HTML formatted document. For example, each page of such a printable and reader-friendly document may have a page number, section headers, the search parameters used to find the document, and/or the time, day, and program from which the text in the documents was captured. Furthermore, each printable and reader-friendly document can be selectively limited in size (e.g., 250 Kbytes). Preferably, the useful information added to documents for a particular user can be pre-defined by the user and saved in a user-profile, as discussed above.

Directly formatting text files into a printable and reader-friendly document is particularly useful and mutually enhances other sub-processes of the present system, such as AutoAlert™, since the printable and reader-friendly document can be automatically e-mailed to a user. For example, a user may create and save a search profile on central server means 130, as described above. Using routines as described above in reference to central server system processing, a printable and reader-friendly document can be automatically generated and sent to the user with or without an accompanying report and/or summary. Preferably, the printable and reader-friendly document is automatically sent to the user utilizing server-side scripting, such as Microsoft's™ VB Script™, and/or mail protocols, such as SMTP. This automated search and delivery routine may be scheduled to occur at intervals pre-determined either by the user or center server means 130. One predetermined event to trigger automated search and delivery routine 480 is when there is a broadcast event containing content that matches a prior search profile from inquiry client 110. A reader-friendly, printable document containing the search results and/or document is automatically e-mailed to inquiry client 110. A preferred means for scheduling a search and delivery routine is Microsoft Windows 2000 Task Scheduler, which is an included component of the Microsoft Windows 2000 operating system. In addition, to conserve resources on central server means 130, a supplemental central server means (not shown) may be dedicated to the automated search and delivery process.

Central server means 130 may provide several methods for reviewing text files. The system optionally provides for retrieval of the complete file from which a key sentence is drawn, thus allowing the user to read in context the full text surrounding any found search term. Another system option provides a means for the user to compile only selected sentences and their citations to a report suitable for printing or otherwise preserving to a user's preferred format. Yet another system option provides a means for the user to compile selected full text versions of found search terms to a report suitable for printing or otherwise preserving to a user's preferred format.

Preferably, results from database 460 are displayed as a citation with associated phrases and/or short sentences that contain the keyword or words in the search profile. In other words, rather than returning the full text of entire broadcasts that contain the keywords, results can be initially returned as key sentences only. These key sentences, because they contain the keywords the user is looking for, provide an overview of the full text, allowing the user to quickly scan many broadcasts without having to look at the full text of each broadcast. The full text of any broadcast or portion thereof is available to the user, for example, by clicking on an associated button and/or link. Thus, users may first see their keywords within the context of specific sentences with the option of "zooming out" to see the sentences in the context of a story, and the story in the context of an entire broadcast. This hierarchy (citation→sentence→story→newscast) is an efficient way of displaying the results of a search that may return hundreds of found text files.

Results from database 460 may be displayed to a user as keywords or a short summary that is linked to the full text file stored on central server means 130. Preferably, the link would contain embedded information that could be used by central server means 130 for management tasks, such as authentication, security, and/or user subscription. For example, ongoing automatic searches may be initiated using search inquires from keywords of interest to a selected business and/or interest group. Search results could be written to a database as described above followed by a targeted electronic mail message that is tailored for and addressed to the selected business and/or interest group. The targeted electronic mail message would contain a phrase or sentence from the search results linked to the full text file. By following the link, a user would access central server means 130 and view the full text file. Regarding user subscription, the foregoing automatic search and targeted messaging routine would be particularly useful in offering trial access to potential customers and/or users for searching limited by time and/or subject matter. A trial access satisfied potential customer could then become an ongoing subscriber by return e-mail or a web-based subscription method.

The systems, methods, and databases of the present invention are broadly applicable. By way of example, a company that manufactures products may wish to know whether broadcast programs are discussing the company and/or its products, and whether such discussions are favorable and/or unfavorable. There is a real-time need for such information. The present invention permits a company to automatically access such information or to have such information automatically electronically transmitted to the company (e.g., via e-mail) for study or appropriate action. Likewise, a company may be able to automatically search and/or monitor authorized and unauthorized uses of its trademarks and trade names in broadcast programs and commercials, such as in tracking its own commercials and commercials by competitors, and to automatically receive related search results and reports.

Another commercial aspect of the present invention is an improved mechanism for attracting prospective customers or users of the present invention. A search profile tailored to a prospective customer and/or similarly interested prospective customers may be formulated and entered into the system in a manner as previously described. The system will automatically and periodically contact (e.g., via e-mail) the prospective customer(s), and automatically provide search results in one or more formats (e.g., a summary report) for examination by the prospective customer(s). The prospective customer(s) may then subscribe via the Internet, e-mail, or otherwise. In this manner, the system, method, and database of the present invention provide a powerful sales promotional tool at minimal costs and with effectively no sales personnel.

In the embodiments of the present invention described above, it will be recognized that individual elements and/or features thereof are not necessarily limited to a particular embodiment but, where applicable, are interchangeable and can be used in any selected embodiment even though such may not be specifically shown. It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense. It is also to be understood that the following claims are intended to cover all of the generic and specific features of the invention herein described and all statements of the scope of the invention that, as a matter of language, might be said to fall there between.

We claim:

1. A system for the automatic collection and conditioning of closed caption text originating from multiple geographic locations comprising:

(1) a remote capture client means having a tuner to receive at least one broadcast source, a decoder operatively connected to said tuner to decode closed caption text streams in said at least one broadcast source, and a text handler operatively connected to said decoder to write said decoded closed caption text streams to one or more closed caption text files; said closed captioned text files being derived from one or more television program segments captioned from one or more geographically diverse television signals; and (2) a central server means for conditioning for format consistency and parsing said text files; and (3) transmission means for transferring said text files from said remote capture client to said central server means, said transmission means being controlled by said remote capture client, whereby said text files are pushed by said remote capture client to said central server means.

2. The system of claim 1, wherein said means for transferring comprises file transfer protocol.

3. The system of claim 1, wherein said means for transferring comprises a move routine, whereby said text files are deleted from said remote capture client means upon successful transfer of said text files to said central server means.

4. The system of claim 3, wherein said move routine comprises an API wrapper.

5. The system of claim 1, wherein said means for transferring initiates a communications session between said remote capture client means and said central server means when a text file is created at said remote capture client means.

6. A method for the automatic collection and conditioning of closed caption text originating from multiple diverse geographic locations comprising:

(a) receiving at least one broadcast source;

(b) decoding closed caption text streams in said at least one broadcast source;

(c) writing said decoded closed caption text streams to one or more closed caption text files;

(d) storing said text files at a remote capture client means; and (e) transferring said text files to a central server means, conditioning said text files for format consistency said transferring being controlled by said remote capture client, whereby said text files are pushed from said remote capture client means to said central server means.

7. The method of claim 6, wherein said step (e) utilizes a file transfer protocol.

8. The method of claim 6, wherein said step (e) further comprises deleting said text files from said remote capture client means upon successful transfer of said text files to said central server means.

9. The system of claim 6, wherein said step (d) is initiated when a text file is created at said remote capture client means.

10. A system for the automatic collection and conditioning of closed caption text originating from multiple geographic locations comprising:

(a) a remote capture client means having a tuner to receive at least one broadcast source of a plurality of broadcast source from geographically diverse locations, a decoder operatively connected to said tuner to decode closed caption text streams in said at least one broadcast source, and a text handler operatively connected to said decoder to write said decoded closed caption text streams to one or more format consistent closed caption text files, said closed captioned text files being directed from one or more television program segments closed captioned from said geographically diverse location; and (b) a central server means for storing and processing said text files;

(c) an inquiry client means for submitting a search profile to said central server;

(d) means for comparing said search profile to said text files to create a search result; and (e) means for displaying said search result using a web browser on said inquiry client.

11. The system of claim 10, wherein said means for displaying comprises a server side scripting environment.

12. The system of claim 10, wherein said server side scripting environment is selected for the group consisting of: ASP, ISAPI, ASP.NET, VB.NET, as combinations thereof.

* * * * *